United States Patent [19]

Cornelsen et al.

[11] 4,451,962
[45] Jun. 5, 1984

[54] POROUS FILTER BLOCK AND METHOD OF MANUFACTURING THE SAME

[75] Inventors: Jürgen Cornelsen; Werner Schneider, both of Oelde, Fed. Rep. of Germany

[73] Assignee: Haver & Boecker, Oelde, Fed. Rep. of Germany

[21] Appl. No.: 360,633

[22] Filed: Mar. 22, 1982

Related U.S. Application Data

[63] Continuation-in-part of Ser. No. 332,357, Dec. 18, 1981, abandoned, which is a continuation of Ser. No. 160,097, Jun. 16, 1980, abandoned.

[30] Foreign Application Priority Data

Jun. 30, 1979 [DE] Fed. Rep. of Germany ....... 2926533

[51] Int. Cl.$^3$ ..................... B23P 15/00; B01D 39/10
[52] U.S. Cl. ........................ 29/163.5 F; 210/499; 210/510.1
[58] Field of Search .............. 210/499, 500.1, 496, 210/497.2, 510; 29/163.5 F; 55/526; 83/15, 19, 55, 128

[56] References Cited

U.S. PATENT DOCUMENTS

| 798,530 | 8/1905 | Rehfuss | 83/128 |
| 1,811,987 | 6/1931 | Wales | 83/128 |
| 2,334,263 | 11/1943 | Hartwell | 55/526 |
| 3,031,827 | 5/1962 | Onstad et al. | 55/526 |
| 3,057,481 | 10/1962 | Pall | 210/499 |
| 3,276,597 | 10/1966 | Mesek et al. | 210/496 |
| 3,690,606 | 9/1972 | Pall | 29/163.5 F |
| 3,792,519 | 2/1974 | Haver | 29/163.5 F |
| 4,122,015 | 10/1978 | Oda et al. | 55/526 |
| 4,126,560 | 11/1978 | Marcus et al. | 210/499 |

FOREIGN PATENT DOCUMENTS

| 2733171 | 2/1979 | Fed. Rep. of Germany | 210/499 |
| 469517 | 8/1975 | U.S.S.R. | 83/19 |

Primary Examiner—Charles N. Hart
Assistant Examiner—John W. Czaja
Attorney, Agent, or Firm—Michael J. Striker

[57] ABSTRACT

A filter block for filtering melt synthetic plastic materials in a process of manufacturing plastics filaments includes a plurality of layers of wire fabric arranged in superimposed relationship. From the top to the bottom the filter block comprises inlet layers, intermediate layers and outlet layers. All the layers of the intermediate portion of the filter block are of identical mesh size which is smaller than mesh size of the inlet and outlet layers. The filter block is produced by cold forming exclusively in a stamp provided with an elastic suport for a pressure plate on which filter layers to be compressed are positioned and with a rigid support, which elastic support and rigid support operate successively to obtain inlet, intermediate and outlet filter layers of differing porosity.

2 Claims, 5 Drawing Figures

POROUS FILTER BLOCK AND METHOD OF MANUFACTURING THE SAME

CROSS-REFERENCE TO RELATED APPLICATIONS

This application is a continuation-in-part of the application Ser. No. 332,357 filed Dec. 18, 1981 which is a Rule 60 continuation of the application Ser. No. 160,097 filed June 16, 1980; now both abandoned.

BACKGROUND OF THE INVENTION

The present invention relates to porous filter blocks. More particularly, the invention relates to filter blocks utilized for filtration of melt synthetic plastic materials in a process of manufacturing fibers of plastics. The present invention further relates to a method of producing porous filter blocks, particularly those utilized for filtering melt synthetic plastic materials.

Known filters include a plurality of superimposed filter discs made from wire filaments of identical or various mesh sizes disposed in a desired row in a ring and bounded by this ring.

For example the allowed German application AS No. 23 18 190.0-27 discloses a filter block wherein filter discs or filter layers are enclosed by a profiled sheet ring so that all the sides of the filter discs will be subjected to tensile loads. The filter layers in the known arrangements may have a round or oval shape or any other desirable geometric form.

Known filter blocks produced by cold-pressing usually include a plurality of superimposed filter layers made out of wire. These layers have the same mesh size in the upper side, lower side and intermediate portion of the filterblock. Such known filterblocks, however can not be effectively used in a process of producing of fibers of plastics where filters with fine mesh of approximately 25 μm are required for filtering melt synthetic plastic material.

SUMMARY OF THE INVENTION

It is an object of the invention to provide improved filter blocks for filtering melt synthetic plastic materials.

It is another object of the invention to provide an improved method of manufacturing of filter blocks for filtration of melt synthetic plastic materials.

Still another object of the invention is to provide a homogeneous filter block wherein size of pores does not change in different working conditions and the filter block can properly operate in all working conditions, particularly in processing of fibers of plastics.

These and other objects of the invention are obtained by a filter block for filtering melt synthetic plastic materials, comprising a plurality of filter layers formed of wire fabric or metal non-woven fabric by means of cold forming exclusively and arranged in superimposed position and defining from the top to the bottom of the filter block inlet layers, intermediate layers and outlet layers, said inlet and outlet layers having a mesh size larger than that of the intermediate layers, the intermediate layers being of identical mesh size and being connected to the outlet layers by at least one layer having a mesh size smaller than that of the intermediate layers.

The objects of the present invention are further attained by a method of manufacturing a filter block for filtering melt synthetic plastic materials, which filter block includes a plurality of superimposed filter layers of wire fabirc or metal non-woven fabric. This method comprises the steps of placing a plurality of filter layers in superimposed relationship between a stamp and a pressure plate of a die and moving the stamp to said pressure plate and compressing said layers under pressure from 10 to 40 kP/cm$^2$ to obtain a preliminary filter pack; providing an elastic support for the pressure plate and punching the filter layers by further moving said stamp to said pressure plate; providing a rigid support for the pressure plate; and cold pressing the filter pack into a filter block under pressure from 700 to 1.400 kp/cm$^2$ to obtain a filter-block having from the top to the bottom inlet layers, intermediate layers and outlet layers, in which block the intermediate layers being of identical mesh size and having a mesh size smaller than that of the inlet layers and outlet layers.

The pressure applied to the filter pack in the cold pressing step may be about 950 kp/cm$^2$.

As a consequence of applying relatively high pressures in cold compressing the filter layers the latter are plastically deformed and layers of required porosity along the height of the filter block are obtained.

The higher the pressure applied to the filter body and causing the deformation of individual filter layers is, the smaller are pores of the filter element obtained after compressing.

The filter block produced by the method of the invention provides a continuously stabilized structure which is highly advantageous over the known filter blocks where the superimposed filter layers in a filter combination may be shifted one with respect to the other under mechanical loads exerted thereon. In the filter blocks of the stabilized structure produced by the method of the invention a homogeneous stream of a liquid or a melt to be filtered is assured over the entire cross-section of the filter element.

Filter blocks of various combinations may be produced by the method of the invention depending upon a mesh size of the filter layer, connections between the wires in a mesh, or metallic material to be used for a filter layer.

The filter elements produced by the method of the invention may be effectively utilized for filtering a melt of synthetic plastic material or filaments produced in spinning arrangements for manufacturing synthetic fibers or wire filaments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE INVENTION

Figure 1:
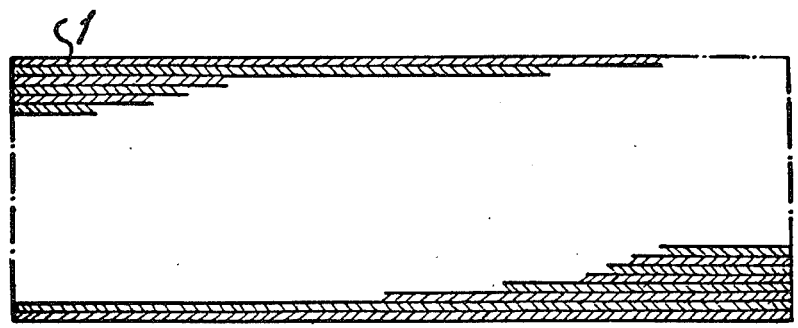
FIG. 1 is a vertical view of a series of superimposed filter discs before compressing.

Referring to the drawings, FIG. 1 shows a number of filter discs 1 positioned one on the top of the other, each made for example of wire mesh. In order to obtain filter discs having relatively planar surfaces, the filter discs are produced by punching out a strip of filter material which is heat treated.

The mesh of filter discs may be formed of metal wires or metal wool or metal fabric or any other non-woven metal fibers.

Figure 2:
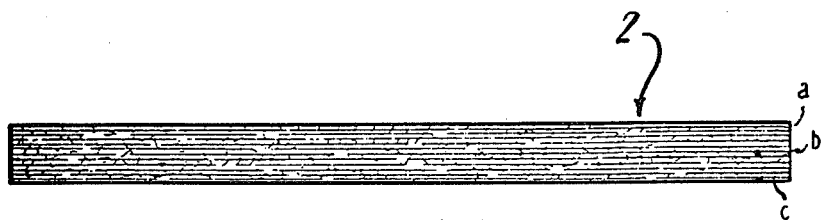
FIG. 2 is a vertical view of a porous filter block produced by a method according to the invention.

FIG. 2 illustrates a filter block which is produced by a method of the invention described in detail below.

Figure 3:
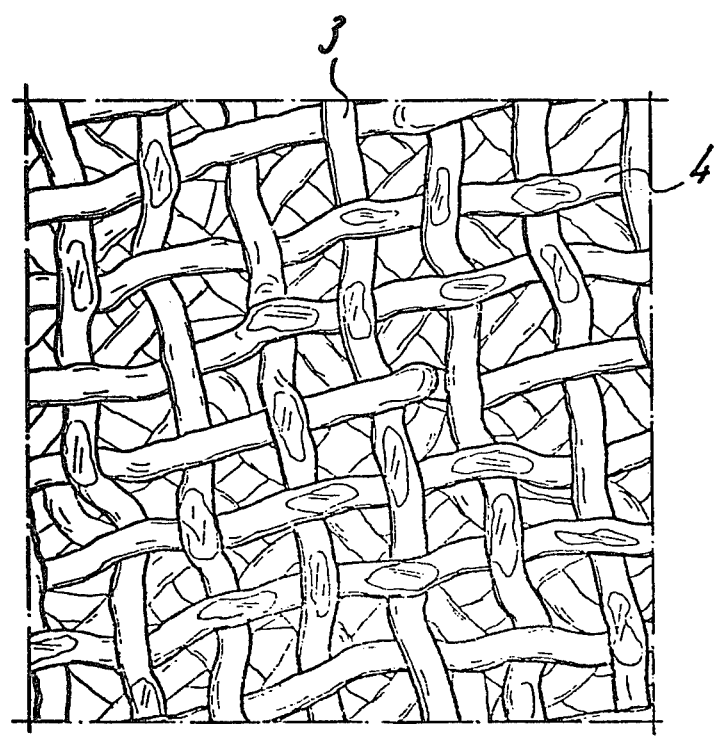
FIG. 3 is a top view of a portion of one filter layer.

As is shown in FIG. 3, the longitudinal and transverse dimensions of wires 3, 4 of the filter discs or layers are changed after compressing as well as the sizes of the pores. By compressing under predetermined pressure the filter layers are subjected to plastic deformation, therefore not only inner connections between two neighboring discs are obtained but also a sufficient forming stability is provided in a filter element produced by the method of the invention.

Figure 4:
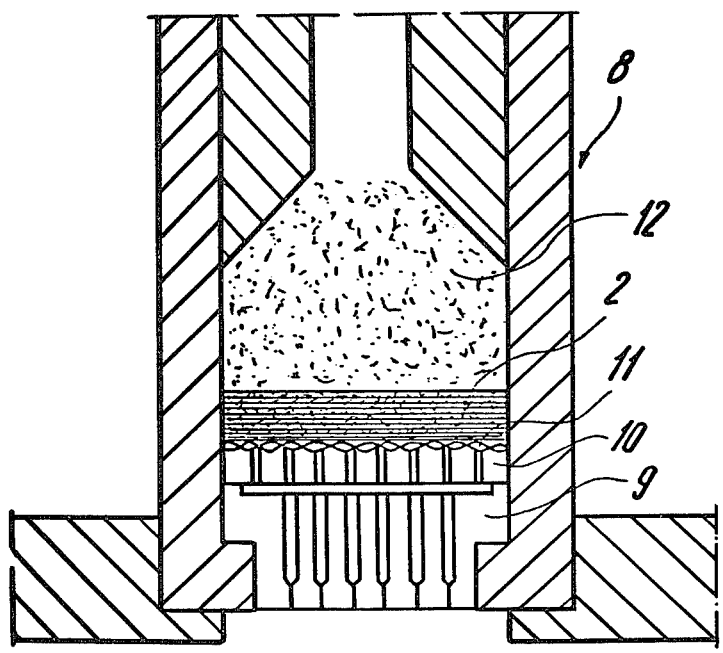
FIG. 4 is a vertical section of a spinning arrangement showing an application of a filter block produced by the method of the invention.

FIG. 4 shows an example of application of a filter block produced by the method of the invention. A porous filter block 2 is installed into a spinning arrangement for manufacturing filaments. The spinning arrangement includes a spinning nozzle 9 having twenty holes (a hole's diameter is 0.28 mm). A distributing plate 10 and a mechanical filter 11 having 60 meshes/cm$^2$ are installed in the arrangement. The remaining free space above the filter block 2 is filled with sand designated as 12 (with an average size of grain: 1 mm). A medium of synthetic plastic material in melt state to be processed through the spinning arrangement is fed into the arrangement under initial pressure of 140 bar. In 23 days of operation pressure increases to 218 bar. The material in melted state is introduced into the arrangement, then passes sand 12, filter block 2, enters the holes of the spinning nozzles 9 from where fabric filaments are come out under the pressure.

The filter block 2 also shown in FIG. 2 includes a plurality of layers which include from the top to the bottom of the block inlet layers a, intermediate layers b and outlet layers c. It is to be understood that melt plastic material after it has passed sand 12 flows through inlet layers a, then intermediate layers b and thereafter outlet layers denoted as c. All intermediate layers along the height of the filter block have pores of identical size. The inlet and outlet layers have a pore size larger them that of the intermediate layers. Between intermediate layers and outlet layers a layer is positioned, which layer has a mesh substantially smaller than that of the intermediate layers.

In the spinning arrangement of FIG. 4 a filter block 2 with 35 filter layers is used, which has a combination of the layers of following dimensions:

1 inlet layer has mesh size 0.4 mm, and a wire of $\phi$ 0.22 mm;
30 intermediate layers with mesh size 0.09 mm and a wire $\phi$ 0.05 mm;
1 layer with minimesh RPD 17 (fein mesh of 0.022 to 0.024 mm)
2 layers with a mesh size 0.09 mm and a wire diameter $\phi$ 0.05 mm.
1 outlet layer with mesh size 1.12 mm and a wire diameter $\phi$ 0.32 mm.

The pressure applied to the melted material in the spinning arrangement is about 30 tons.

The material used for wire filaments may be material 1.4301 which corresponds to AISI 304 in U.S. standards.

2 layers with a mesh size 0.09 mm and a wire diameter 0.05 mm between the minimesh layer and outlet layer may be omitted. In this case the distribution of layers in the filterblock will be as follows:

1 inlet layer with mesh size 0.4 mm and wire $\phi$ 0.22 mm.
30 intermediate layers with mesh size 0.09 mm and wire $\phi$ 0.05 mm;
1 layer with minimesh RPD 17; and 1 outlet layer with mesh size 1.12 mm and wire $\phi$ 0.32 mm.

On the photographs P1 3936, 3925, 3935 and 3926 intermediate and end filter layers are shown. These photographs were made in the Institute of Microscopy, Photography and Kinematography of Frauhofer Corporation e.V. in Karlsruhe. The photographs illustrate intensive cold-deformation of individual filter layers throughout their surface resulting in required porosity of the filter block.

It is to be understood that relatively thick zone of intermediate layers in the filter block forms a storage for a melt plastic material passing the filter. This intermediate zone of the block operates like deep filter.

A method of producing filter blocks with various layers along the height of the filter block will be explained with reference to FIG. 5.

Figure 5:
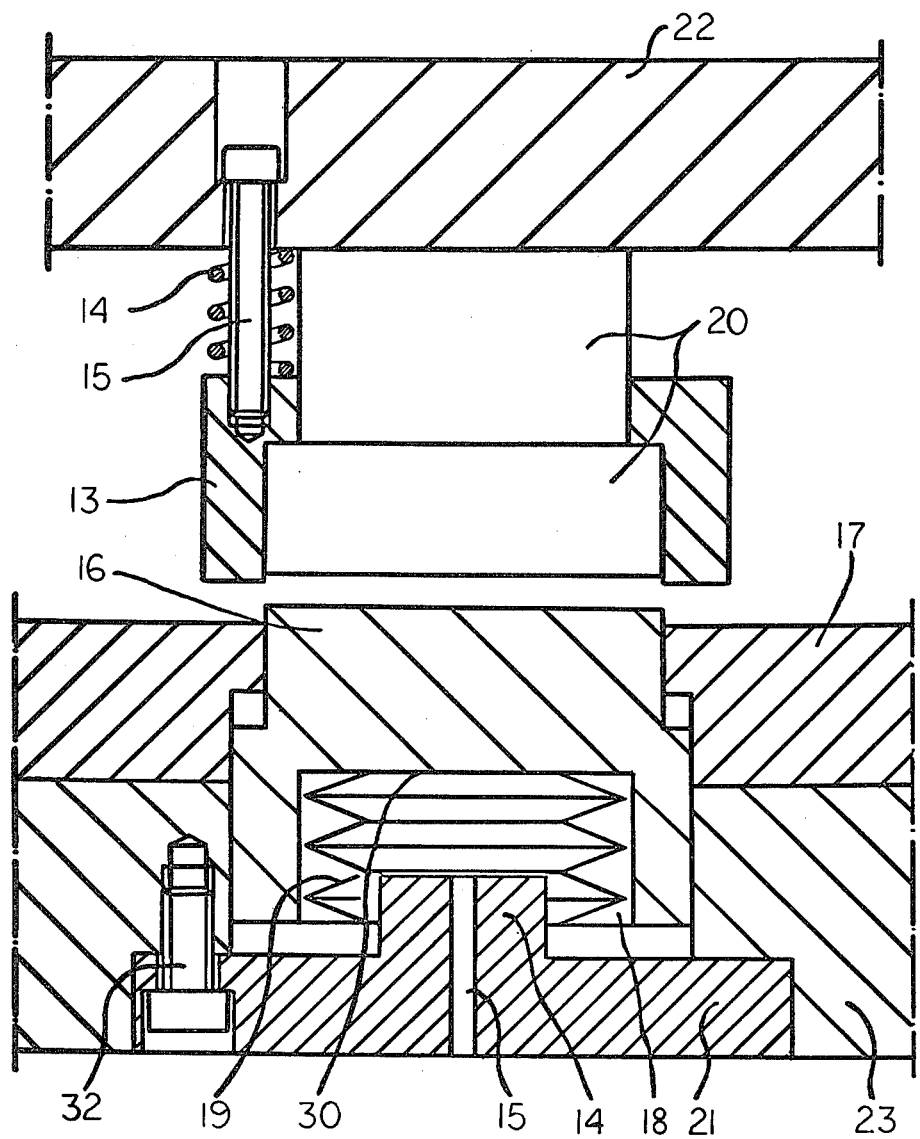
FIG. 5 is an axial section of a device for manufacturing a filter block according to the invention.

FIG. 5 illustrates a device for manufacturing porous filter blocks of the invention. This device includes a stamp or piston 20 the upper part of which is supported in an upper stamp holder 22 and the lower part of which is arranged in a stripper 13. A number of helical springs 14 (only one spring is shown in the drawing) are arranged between the upper stamp holder 22 and stripper 13, which springs surround respective guide bolts 15 so as to enable relative movement of the stripper 13 to the stamp.

The device further comprises a pressure plate 16 which is vertically slidably positioned in a cylindrical recess formed in a die 17. The pressure plate has a chamber 18 which is open from the bottom, chamber 18 receiving a stack of springs 19, which may be Beleville springs. This stack with its upper end rests against the base surface 30 of chamber 18 and with its lower end is supported on a base plate 21. Base plate 21 is secured to a lower stamp holder 23 by means of bolts 32. The base plate 21 is provided with a guiding projection 14 extending into chamber 18. The guiding projection 14 is formed with a ventilation bore 15.

As seen from FIG. 5, the pressure plate 16 illustrated in its started or initial position projects outwardly of die 17. When a stack of plurality of filter layers composed of strips of wire fabric is now placed onto the upper surface of the pressure plate and stamp 20 is moved down the filter layers in the stack become compressed until the upper surface of the pressure plate is in alignment with the upper surface of die 17. This preliminary pressing is performed under pressure from 10 to 40 kp/cm$^2$.

During further movement of stamp 20 in downward direction pressure plate 16 yields back upwardly by means of elastic support provided by springs 19 which act on pressure plate 16; the punching process begins and the filter layers in the filter stack are punched. When stamp 20 is moved down further pressure plate 16 thrusts against base plate 21 so that rigid support for the stamp is provided whereby cold deforming of multiple layer stack into filter block with layers of differing porosity takes place.

The advantage of the device for producing multiple-layer filter blocks is that the tool is formed as a multiple tool capable of compressing filter layers in several different steps so that a stack or sandwich of plurality of superimposed filters is produced by punching in one step of operation, which stack is then cold pressed into a porous filter block in another step of operation.

The larger pores are required in outlet layers of the filter block the lower predetermined pressures are applied to the stack of filters in cold pressing of the stack into the porous filter block.

It will be understood that each of the elements described above, or two or more together, may also find a useful application in other types of porous filter block differing from the types described above.

While the invention has been illustrated and described as embodied in a porous filter blocks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing a porous filter block for filtering melt synthetic plastic materials which includes a plurality of superimposed filter layers of wire fabric or metal non-woven fabric, the method comprising the steps of placing a plurality of filter layers in superimposed relationship between a stamp and a pressure plate of a die and moving the stamp to said pressure plate and compressing said layers throughout their surfaces under pressure from 10 to 40 $kp/cm^2$, to obtain a preliminary filter pack; providing an elastic support for the pressure plate and punching the filter layers by further moving said stamp to said pressure plate; providing a rigid support for said pressure plate, and cold pressing said filter pack into a filter block under pressure from 700 to 1.400 $kp/cm^2$, said compressing step, said punching step and said cold pressing step being performed in a consecutive order so as to obtain a filter block having from the top to the bottom inlet layers, intermediate layers and outlet layers, in which the intermediate layers are of identical mesh size and have a mesh size smaller than that of said inlet layers and outlet layers.

2. The method of claim 1, wherein the pressure applied to the filter pack in said cold pressing step is about 950 $kp/cm^2$.

* * * * *